United States Patent [19]

Park

[11] Patent Number: 5,627,549

[45] Date of Patent: May 6, 1997

[54] DUAL CHANNEL ADVERTISING REFERENCING VEHICLE LOCATION

[75] Inventor: Michael C. Park, Portland, Oreg.

[73] Assignee: Seiko Communications Holding N.V., Netherlands Antilles

[21] Appl. No.: 585,604

[22] Filed: Jan. 16, 1996

Related U.S. Application Data

[63] Continuation of Ser. No. 282,893, Jul. 29, 1994, abandoned.

[51] Int. Cl.[6] .............................. H04B 7/185; G01S 5/02
[52] U.S. Cl. ..................... 342/357; 364/449.1; 340/996
[58] Field of Search ........................... 342/357; 364/449; 340/996

[56] References Cited

U.S. PATENT DOCUMENTS

| | | | |
|---|---|---|---|
| 5,299,132 | 3/1994 | Wortham | 364/460 |
| 5,303,393 | 4/1994 | Noreen et al. | 455/12.1 |
| 5,353,034 | 10/1994 | Sato et al. | 342/457 |
| 5,359,527 | 10/1994 | Takanabe et al. | 364/449 |
| 5,365,449 | 11/1994 | Kashiwazaki | 364/449 |
| 5,470,233 | 11/1995 | Fruchterman et al. | 434/112 |
| 5,504,482 | 4/1996 | Schreder | 340/995 |
| 5,507,485 | 4/1996 | Fisher | 273/32 R |

*Primary Examiner*—Theodore M. Blum
*Attorney, Agent, or Firm*—Elmer Galbi

[57] ABSTRACT

A vehicle information device and collects information concerning specific geographic points of interest. The operator recalls for display such information, including a display showing direction and distance of travel to a designated geographic point of interest relative to a then-current vehicle location. Dual channel advertising is transmitted by voice broadcast and by data broadcast. Upon hearing in the voice broadcast an advertisement of interest, the operator captures the associated data broadcast including, among other detailed text message information, the location of the advertiser. Distance and relative direction of travel from the current vehicle location to the geographic point of interest is thereby presented. Multiple geographic points of interest are stored for selective review whereby the user constructs a database containing locations of particular interest to a particular person.

2 Claims, 6 Drawing Sheets

DUAL CHANNEL ADVERTISING REFERENCING VEHICLE LOCATION

This application is a continuation of application Ser. No. 08/282,893, filed Jul. 29, 1994 which is now abandoned.

BACKGROUND OF THE INVENTION

The present invention relates generally to vehicle information systems, and particularly to vehicle information systems providing information relevant to current vehicle location.

A variety of traffic related information is now available for use in aiding vehicle travel, especially in urban road networks. A travel information device likely to be soon more commonly incorporated into vehicles is a vehicle position detecting system, e.g., the well known global positioning system (GPS) providing satellite broadcast to determine location of a receiving GPS device. Vehicles with GPS capability, therefore, have the very useful feature of tracking current vehicle position.

Given access to current vehicle location, i.e., longitude and latitude values, a proposed information system provides vehicle position relative to a map representation of a given region, e.g., a map display of city streets with vehicle position indicated by street location rather than longitude and latitude position. Thus, a digital map database further supports vehicle position display by reference to more meaningful information, i.e., by reference to a street map. To be of value, however, the digital map database must be current and comprehensive, i.e., have information relevant to wherever a vehicle may be used.

Massive digital map databases are, however, inherently expensive and difficult to include in mass produced products such as is desirable in a GPS-capable consumer product. Digital map databases require license fees, large amounts of memory, frequent and expensive revision, and generally cannot be comprehensive enough to allow use throughout the entire world. It is not economically feasible to provide in an inexpensive consumer product a digital map database covering the entire world, or at least a significant geographic region. If the device is prepared for use throughout the world, an incredibly massive digital map is required giving rise to significant cost and maintenance requirements. If only selected geographic regions are incorporated into the digital map, the device cannot be used outside such geographic regions without post-manufacture modification or manipulation of numerous storage devices, e.g., a library of CD-ROM discs.

It would be desirable, therefore, for a vehicle information device to be usable in any geographic area as manufactured yet still maintain an ability to indicate vehicle position information beyond merely longitude and latitude. In particular, people need more meaningful information than merely longitude and latitude, yet a massive digital map is difficult to justify in the context of relatively inexpensive consumer products. The need for current vehicle position is most typically a need to know current vehicle position relative to a location of interest. Unfortunately, customizing massive digital databases to provide reference to individual vehicle operator locations of interest is impractical. It would be desirable to avoid a requirement of procuring and maintaining in the travel information device a massive digital database, yet maintain an ability to reference geographic locations. The subject matter of the present invention provides such a vehicle travel information device.

SUMMARY OF THE INVENTION

In accordance with the present invention, a travel information device in a vehicle includes a vehicle position detecting device and collects vehicle position information while also collecting data relevant geographic points of interest to provide a display indicating position of a point of interest relative to a current vehicle location.

In the illustrated and preferred form of the present invention, collecting information relevant to geographic points of interest is by radio signal data broadcast in conjunction with radio signal voice broadcast, such as advertising, whereby a user interrogates a device under the present invention to collect by data broadcast detailed information concerning an advertisement of interest provided by a companion voice broadcast. The data broadcast includes precise location information providing, in conjunction with current vehicle position, a basis for presenting a display graphically showing relative position between the geographic point of interest, such as the location of an advertiser, and the current vehicle location.

According to one aspect of the present invention, storage of information relative to geographic points of interest builds for the user a personal electronic reference for later selectively displaying such information, including ability to selectively display a representation of location relative to a then current vehicle position.

The subject matter of the present invention is particularly pointed out and distinctly claimed in the concluding portion of this specification. However, both the organization and method of operation of the invention, together with further advantages and objects thereof, may be best understood by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION OF A PREFERRED EMBODIMENT

Figure 1:
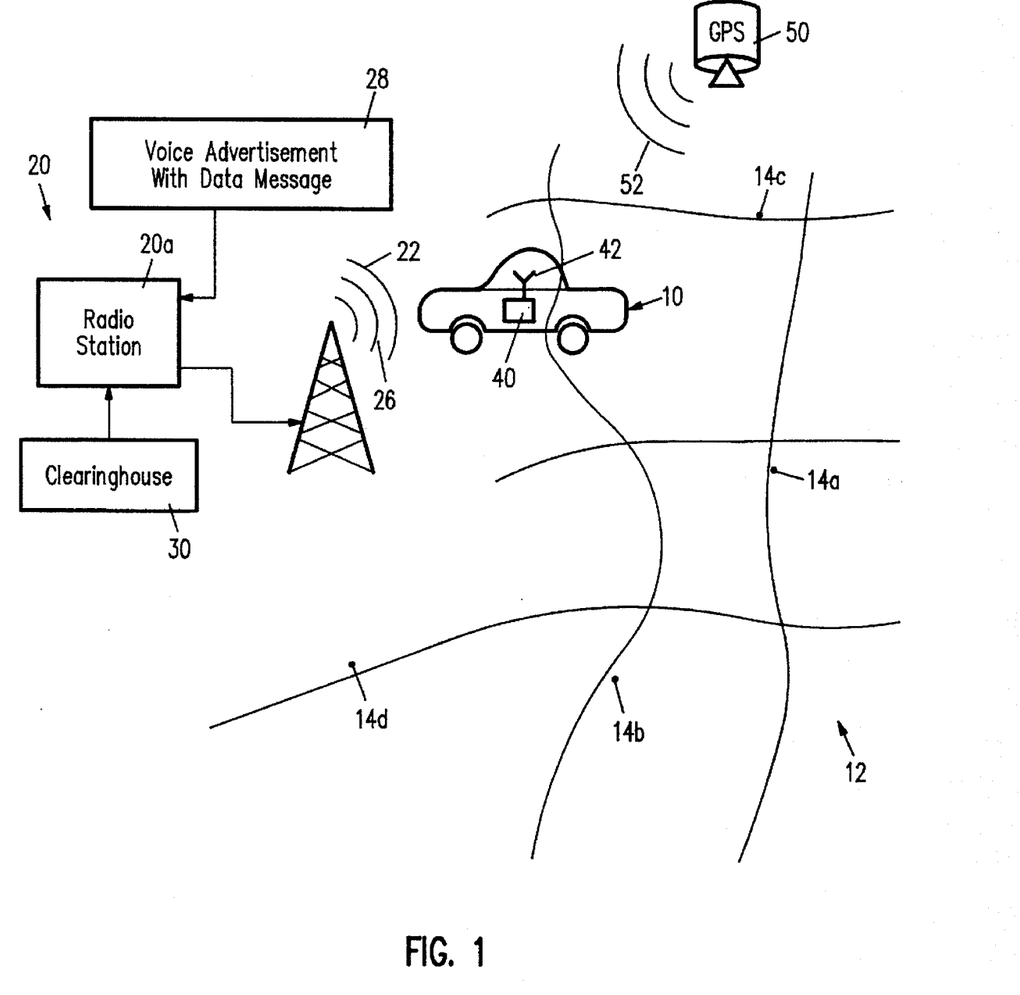
FIG. 1 illustrates a vehicle information system, a given road network, and a vehicle travelling within the road network and carrying a travel information device according to a preferred form of the present invention.

In FIG. 1, a vehicle 10 travels within a road network 12. Network 12 includes main arterial roadways as illustrated, but as may be appreciated would be significantly more complex. For the present illustration, it will be understood that vehicle 10 travels throughout road network 12 along any selected travel route. Furthermore, the operator of vehicle 10 travels within road network 12 to and from geographic points of interest 14, individually designated 14a–14d. While only several such geographic points of interest 14 are indicated in FIG. 1, it will be understood that any number of such geographic points of interest 14 may exist within road network 12. Furthermore, geographic points of interest 14 for one individual vary relative to that of another individual. Accordingly, reference herein to geographic points of interest 14 shall be taken to be locations of interest to a particular person.

Also illustrated in FIG. 1, radio broadcast system 20 provides a combined radio signal voice broadcast 22 and radio signal data broadcast 26. While illustrated as a single radio broadcast system 20, it will be understood that voice broadcast 22 and data broadcast 26 could originate from separate radio signal broadcast facilities. Under the preferred form of the present invention, however, voice broadcast 22 and data broadcast 26 originate from a common FM radio source as provided under the "Gaskill" paging system. The present invention may be implemented according to many paging system protocols, but as illustrated herein operates under the time-division multiplexed protocol of the Gaskill paging system, as illustrated in U.S. Pat. Nos. 4,713,808 and 4,897,835. The disclosure of U.S. Pat. Nos. 4,713,808 and 4,897,835 are incorporated herein fully by reference thereto.

The Gaskill paging system and associated receiving devices provide an inexpensive, highly battery-efficient and highly miniaturized paging device which, under the illustrated embodiment of the present invention, constitutes a data radio signal receiver 62 (FIG. 2) as a conduit for data broadcast 26 delivery to device 40.

Generally the Gaskill paging system uses FM radio signal transmission facilities to broadcast within a side-band frequency paging signal data packets according to a time-division multiplexed protocol. Thus, voice broadcast 22 comprises the normal FM radio signal broadcast and data broadcast 26 represents the side-band paging system broadcast.

It will be understood, therefore, that radio broadcast system 20 provides coordinated voice and data by radio signal. In particular, radio broadcast system 20 receives voice advertisement and data message information 28, e.g., an advertising subscription, and integrates the data message portion thereof into other incoming paging system data packets originating from a Gaskill paging system clearinghouse 30. In this manner, radio station 20a coordinates or associates voice and data broadcasts 22 and 26, respectively. As may be appreciated, however, the data message portion of information 28 could be routed through clearinghouse 30, in which case radio station 20a associates a voice broadcast 22 with a data broadcast 26 originating entirely from clearinghouse 30. Such association may be provided by a number of arrangements, but under the illustrated form of the present invention, association of voice broadcast 22 and data broadcast 26 shall be by time relation, e.g., concurrently broadcast, broadcast in close time relationship, or at given time offset.

Vehicle 10 includes a travel information device 40 receiving by way of antenna 42 the voice broadcast 22 and data broadcast 26. Thus, device 40 receives conventional FM voice broadcasts and paging data broadcasts the Gaskill paging system protocol. In this manner, device 40 receives associated voice and data broadcasts whereby an operator of vehicle 10, upon hearing a voice broadcast of interest, captures the associated data broadcast to collect and store within device 40 detailed information, i.e., a data record including longitude and latitude, for a geographic point of interest 14.

FIG. 1 also illustrates a global position system (GPS) satellite 50 providing transmission 52. Details and use of GPS transmission and the collection of such transmission to determine location of a GPS receiver are well known. Use of GPS transmission 52 under the present invention is by incorporation of a global position system receiving device into travel information device 40 collection of a current vehicle position therewith as described more fully hereafter.

Thus, travel information device 40 receives several channels of information. First, voice broadcast 22 provided by radio broadcast system 20 provides to the vehicle operator a stream of voice information potentially including reference to geographic points of interest 14, i.e., advertisers located within road network 12. Second, data broadcast 26, as provided in association with voice broadcast 22, provides further detailed text message information captured selectively by device 40, e.g., when commanded by the operator of vehicle 10. This establishes, among other detailed information, a precise location for a geographic point of interest 14. Third, the global position system transmission 52 provides a current vehicle location and, therefore, a basis for presenting location of geographic points of interest 14 relative to current vehicle position.

As described more fully hereafter, device 40 maintains a database containing a collection of data records obtained from data broadcast 26. Each data record corresponds to a geographic point of interest 14, and device 40 displays a vector, i.e., distance and direction, indicator illustrating the relative position of a given geographic point of interest 14 relative to current vehicle location. In this manner, device 40 constructs and maintains information specific to a user of device 40, i.e., maintains information relative to geographic points of interest 14 selected by the operator of vehicle 10, and further provides meaningful position information beyond longitude and latitude for such points of interest 14 without reference to a massive digital map database of the road network 12. Device 40 maintains current information relative to a given geographic region and specific to selected geographic points of interest 14. Under one aspect of the present invention, such geographic points of interest 14 correspond generally to locations of advertisers providing, by way of radio broadcast system 20, both voice information in broadcast 22 and detailed message or text data in broadcast 26. This allows listeners to later reference such data and locate the corresponding geographic point of interest 14 relative to a then current vehicle position.

Figure 2:
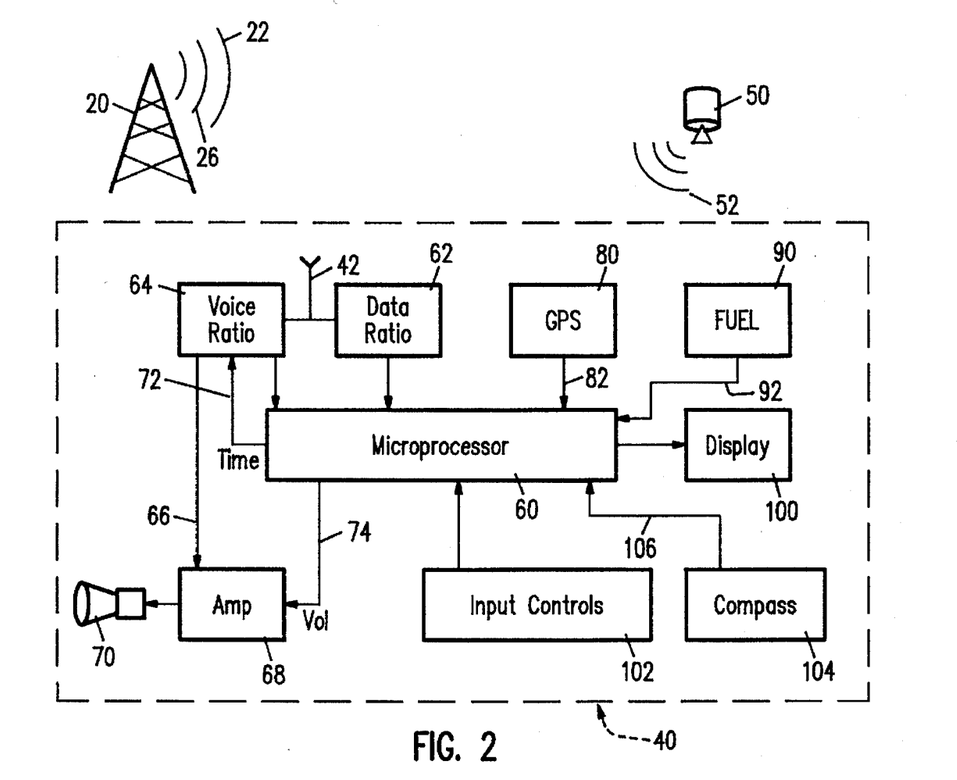
FIG. 2 is a block diagram of the travel information device for the vehicle of FIG. 1.

FIG. 2 illustrates in block diagram travel information device 40. In FIG. 2, a microprocessor 60 orchestrates generally operation of device 40. Data radio signal receiver 62 couples antenna 42 to microprocessor 60. As contemplated under the preferred form of the present invention, data radio signal receiver 62 comprises essentially a paging system receiver operating under the Gaskill paging system. Thus, the Gaskill system paging device provided as receiver 62 serves as a data terminal collecting data broadcast 26 and providing to microprocessor 60 detailed information associated with, for example, an associated voice advertisement broadcast in voice broadcast 22. A voice radio receiver 64, also coupled to antenna 42, receives the voice broadcast 22 and delivers a voice signal 66 to an amplifier 68 driving a speaker 70. Microprocessor 60 tunes voice radio receiver 64 by way of a tune control 72. Thus, microprocessor 60 selects a radio signal voice broadcast 22 by tune control 72 and, by way of volume control 74 applied to amplifier 68, causes presentation of the corresponding voice broadcast on speaker 70.

A global position system receiver 80 receives the transmission 52 from global position system satellite 50 and delivers to microprocessor 60 a current vehicle location 82. In this manner, microprocessor 60 requests from global position system radio receiver 80 a current vehicle location and receives in return the current vehicle location 82.

Microprocessor 60 receives other vehicle information. For example, a fuel gauge sensor 90 provides a fuel remaining input 92 to microprocessor 60.

Microprocessor 60 drives a display 100. Display 100 presents, for example, tuning and station selection information relative to the voice radio receiver 60 to provide an FM radio capability wherein the operator of vehicle 10 manipulates input controls 102, i.e., volume, station select, and other controls described more fully hereafter, to listen to a selected voice broadcast 22. Display 100 further presents, as described more fully hereafter, data relevant to stored geographic points of interest 14 and also graphic indication, i.e., a vector indicating distance and direction, of a selected geographic point of interest 14 relative to the current vehicle location.

A compass 104 provides a vehicle orientation input 106 to microprocessor 60. Device 40 uses the current vehicle position, i.e., as provided by vehicle location 82, and also the current vehicle orientation, as provided by input 106, to calculate a graphic indication, i.e., a display vector orientation, indicating direction of travel for a geographic point of interest 14 relative to the current vehicle position. To portray on display 100 the relative direction, i.e., toward the geographic point of interest, current vehicle orientation is considered. Thus, calculation and display of a vector on display 100 begins with calculation of distance between two points designated by longitude and latitude values, i.e., distance between the current vehicle location and the geographic point of interest 14, and calculation of an angle of orientation for a direction of travel. In other words, display 100 has a fixed relationship relative to vehicle 10 and vehicle orientation input 106 supports an accurate display of a direction of travel as presented by vector icon on display 100. Furthermore, the display presented may be updated as vehicle 10 moves and the distance between vehicle 10 and the geographic point of interest 14 changes and also as vehicle orientation changes.

Figure 3:
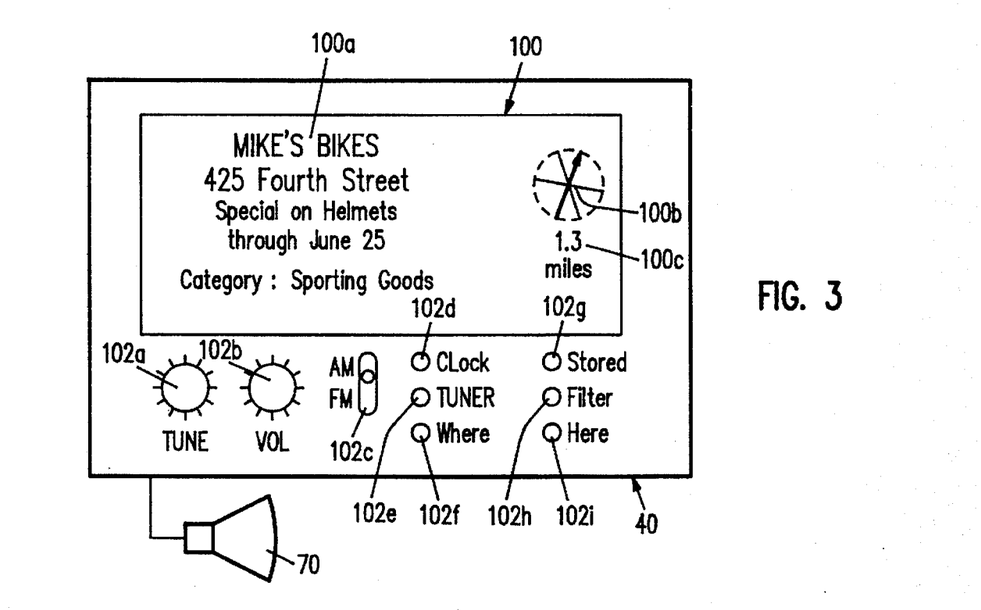
FIG. 3 illustrates the front panel controls and display of the travel information device of FIG. 2 as viewed by the operator of the vehicle of FIG. 1.

FIG. 3 illustrates a front view of the travel information device 40 monitoring the combined voice and data broadcasts 22 and 26 and global positioning system broadcast 52. FIG. 3 also illustrates display 100 and input controls 102. Input controls 102 include a tune dial 102a, a volume dial 102b and an AM/FM switch 102c. As may be appreciated, device 40 operates, from a user perspective, in part as a conventional car radio. The user manipulates input controls 102a–102c to listen to a voice broadcast 22 on speakers 70. Additional control inputs 102 for device 40 include a clock button 102d, a tuner button 102e, a where information button 102f, a stored information button 102g, a filter button 102h, and a here button 102i. Use of input controls 102d–102i will be explained more fully hereafter, but generally provide to the user various display presentations relative to display 100 and modes of operation for device 40.

As illustrated in FIG. 3, display 100 presents a text message display portion 100a showing information such as vendor name, address, and current marketing information, for example, a sale or promotional activity including a date of availability for the promotional activity. Display portion 100a further presents a category of vendor, e.g., sporting goods. As may be appreciated, the data records obtained from data broadcast 26 and stored in device 40 include a variety of fields as indicated generally by the display portion 100a in FIG. 3. In such form, information maintained in device 40 may be manipulated in the manner of a database, e.g., searching, sorting, and other such database record management functions.

Display 100 further provides a vector angle portion 100b and a vector distance-to-travel portion 100c. As described herein above, angle portion 100b indicates the relative orientation of a direction of travel from the current vehicle location to a selected geographic point of interest 14. Distance-to-travel portion 100c represents the distance separating the current vehicle location and the geographic point of interest. The angular orientation of portion 100b desirable takes into account the current vehicle 10 orientation input 106 as provided by compass 104. Presentation of vector angle portion 100b should, therefore, indicate generally a direction of travel considering the viewer's perspective, i.e., looking at display 100 from within vehicle 10, to indicate appropriately the relative orientation of a direct line-of-sight or direction-of-travel from the current vehicle position to the geographic point of interest 14.

Clock button 102d, when pressed, causes presentation by microprocessor 60 on display 100 the current time of day. Tuner button 102e, when pressed, causes presentation on display 100 by microprocessor 60 information relevant to tuning voice broadcast radio 64, e.g., frequency of station currently tuned, preset features available, and any other information normally displayed in connection with operation of a voice broadcast radio.

Where information button 102f, when pressed, indicates to microprocessor 60 operator desire to collect information from data broadcast 26. For example, voice broadcast 22 and data broadcast 26 are synchronized broadcasts and the operator of device 40 hears an advertisement of interest provided by way of voice broadcast 22 and presses the where information button 102f for further information. Microprocessor 60 then collects a data record, i.e., text message information relative to the advertisement of interest, by way of data broadcast 26 and data receiver 62. Text message information presented in display portion 100a is obtained, therefore, by the operator activating the where information button 102f during or just after a voice broadcast advertisement of interest.

Device 40 holds multiple data records, i.e., one for each geographic point of interest 14. Stored information button 102g allows scanning through such stored data records and selective display of the previously stored data record for a geographic point of interest 14. In this manner, the user of device 40 constructs a personal electronic reference tracking travel information including data records for particular geographic points of interest 14, i.e., data records selected by and of interest to a particular user. The user thereby builds a personalized and current database of geographic points of interest 14.

Filter button 102h drives device 40 into an automatic data collection mode according to user selected filter criteria. For example, device 40 monitors the stream of data provided in data broadcast 22 and compares location information therein to the current vehicle location to collect all references within a given distance of current vehicle location. Additionally, the user establishes a category of interest, e.g., auto parts advertisements, grocery store advertisements, sporting goods or restaurant advertisements, to further filter information available in data broadcast 22. In this manner, the user of device 40 creates automatically a customized database by designating geographic points of interest 14 according to user-selected criteria.

The here button 102i provides another method of creating a data record concerning a geographic point of interest 14 within device 40, in this case one corresponding to current vehicle location. The operator presses here button 102i and creates a geographic point of interest 14 data record corresponding to current vehicle location. This allows the user to begin at a given location, operate here button 102i, and have ability to reference that given location later while travelling, e.g., to return to that given location or to have directional indication of that given location from another vehicle location. The data record created by device 40 in response to the here button 102i includes at least the longitude and latitude information corresponding to the vehicle position at the time of button 102i activation. Additional textual information can be entered by the user if desired, e.g., textual information entered by operation of control inputs 102 in response to supporting prompts presented on display 100. For example, the user may wish to name a location in conjunction with activating the here button 102i for meaningful later reference thereto.

Figure 4:
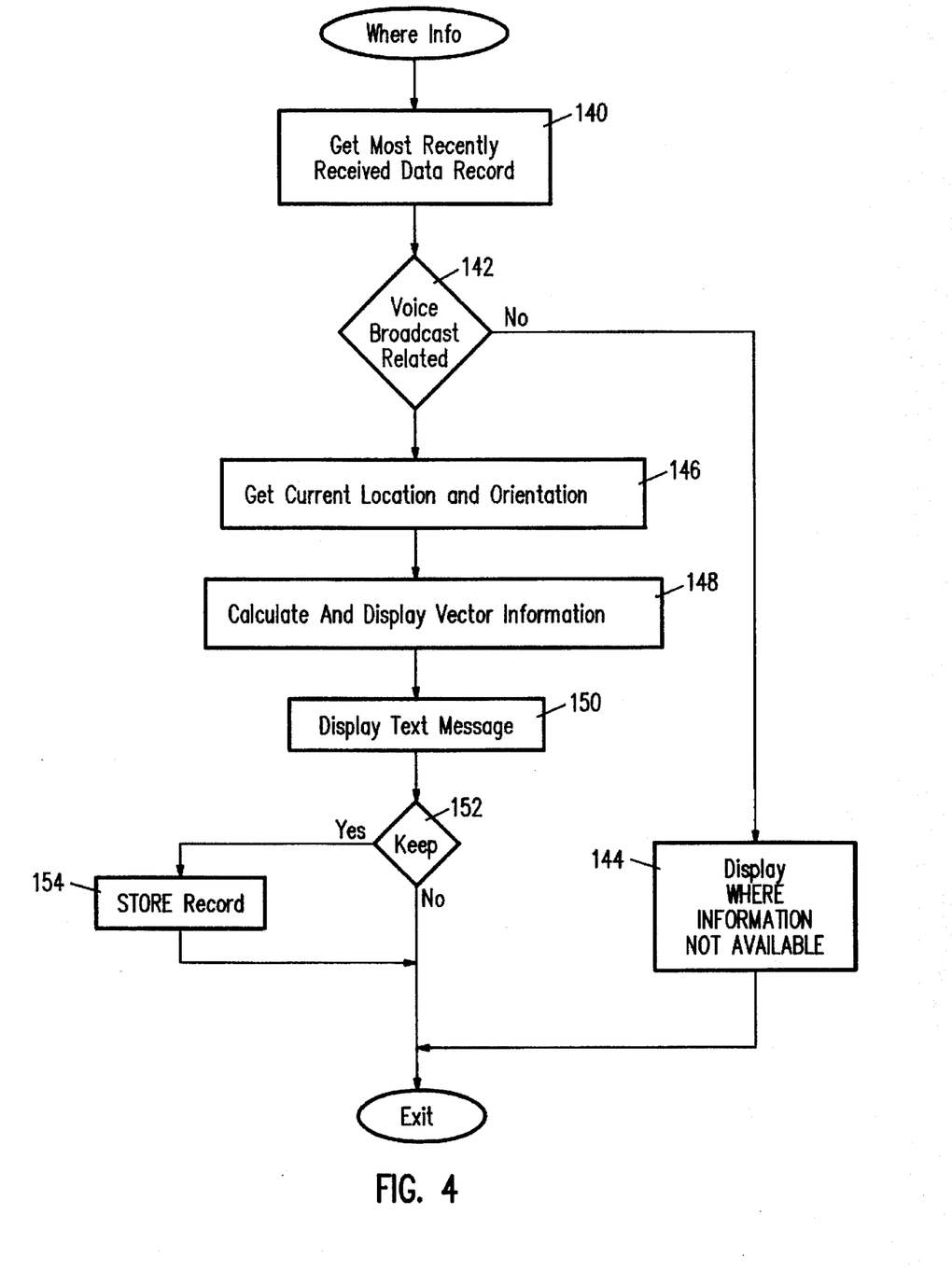
FIG. 4 illustrates by flow chart a first method of collecting data for storage by the travel information device wherein the user hears by voice broadcast information of interest an selects corresponding data broadcast information for storage.

FIG. 4 illustrates programming of microprocessor 60 for information collection from data broadcast 26, i.e., in this case in response to activation of where information button 102f. In FIG. 4, it will be assumed that voice broadcast 22 and data broadcast 26 are associated by simultaneous broadcast. As may be appreciated, other association methods may be employed and incorporated into the illustrated embodiment of the present invention. Processing in response to user activation of the where information button 102f begins in block 140 where microprocessor 60 collects the most recently received data record of data broadcast 26. As shown in the present embodiment, voice broadcast 22 and data broadcast 26 are associated by simultaneous presentation and microprocessor 60 need only collect in response to activation of the where information button 102f the current presented or most recently presented data record in data broadcast 26. In anticipation of such task, microprocessor 60 always collects in an input buffer (not shown) each data record presented in data broadcast 26. For each new data record presented, the old, previous data record is replaced in the input buffer. Thus, when the operator activates where information button 102f, the input buffer holds, or will soon hold, a complete data record taken from data broadcast 26 and associated with the current voice broadcast 22 presentation. Thus, processing in block 140 implements a method of association between voice broadcast 22 and data broadcast 26.

Decision block 142 determines whether the current voice broadcast 22 is related to the most recently received data record. For example, not every voice broadcast 22 presentation, e.g., advertisement, will have an associated data record available in data broadcast 26. For example, if the data record most recently received by way of data broadcast 26 is "stale" then it should not be taken as related to the current voice broadcast 22 presentation. In such case, processing branches through block 144 where device 40 presents on display 100 the message "where information not available" and processing terminates. If, however, the data record most recently received is related to the voice broadcast 22 presentation, i.e., not "stale", then processing advances to block 146 where microprocessor 60 obtains the current vehicle location and vehicle orientation. As may be appreciated, determining whether a given data record is "stale" may be implemented by time-stamping data records held in the input buffer. The length of time required to become "stale" in the input buffer is variable and a function of how quickly the operator of vehicle 10 must activate the where information button 102f.

Microprocessor 60 then calculates in block 148 the angle portion 100b and distance-to-travel portion 100c. In other words, microprocessor 60 calculates and angle of orientation for the arrow icon presented in portion 100b using the current vehicle orientation 106 and the direction of travel toward the subject geographic point of interest 14. Microprocessor 60 then calculates the distance-to-travel value for portion 100c as the separation between the current vehicle position and subject geographic point of interest 14.

As may be appreciated, a timer interrupt may also be set to itteratively execute procedures updating the display portions 100b and 100c as the vehicle changes orientation and location relative to the geographic point of interest 14 associated with the current data record. Furthermore, microprocessor 60 may take into account fuel remaining input 92 in comparison to expected vehicle 10 mileage and consider separation between current vehicle position and the subject geographic point of interest 14. If vehicle 10 holds insufficient fuel to make the trip to the subject geographic point of interest, an appropriate display may be presented to indicate such condition to the vehicle operator.

Continuing to block 150, microprocessor 60 presents in display portion 100a the text message portion of the current data record, e.g., vendor name, address, phone number, and any other special promotional information provided. In decision block 152, the operator has opportunity to keep for permanent storage the current data record, in which case processing branches through block 154 where the current data record is stored for later reference, i.e., by operation of the stored information button 102g. Otherwise, processing exits directly from decision block 152.

Figure 5:
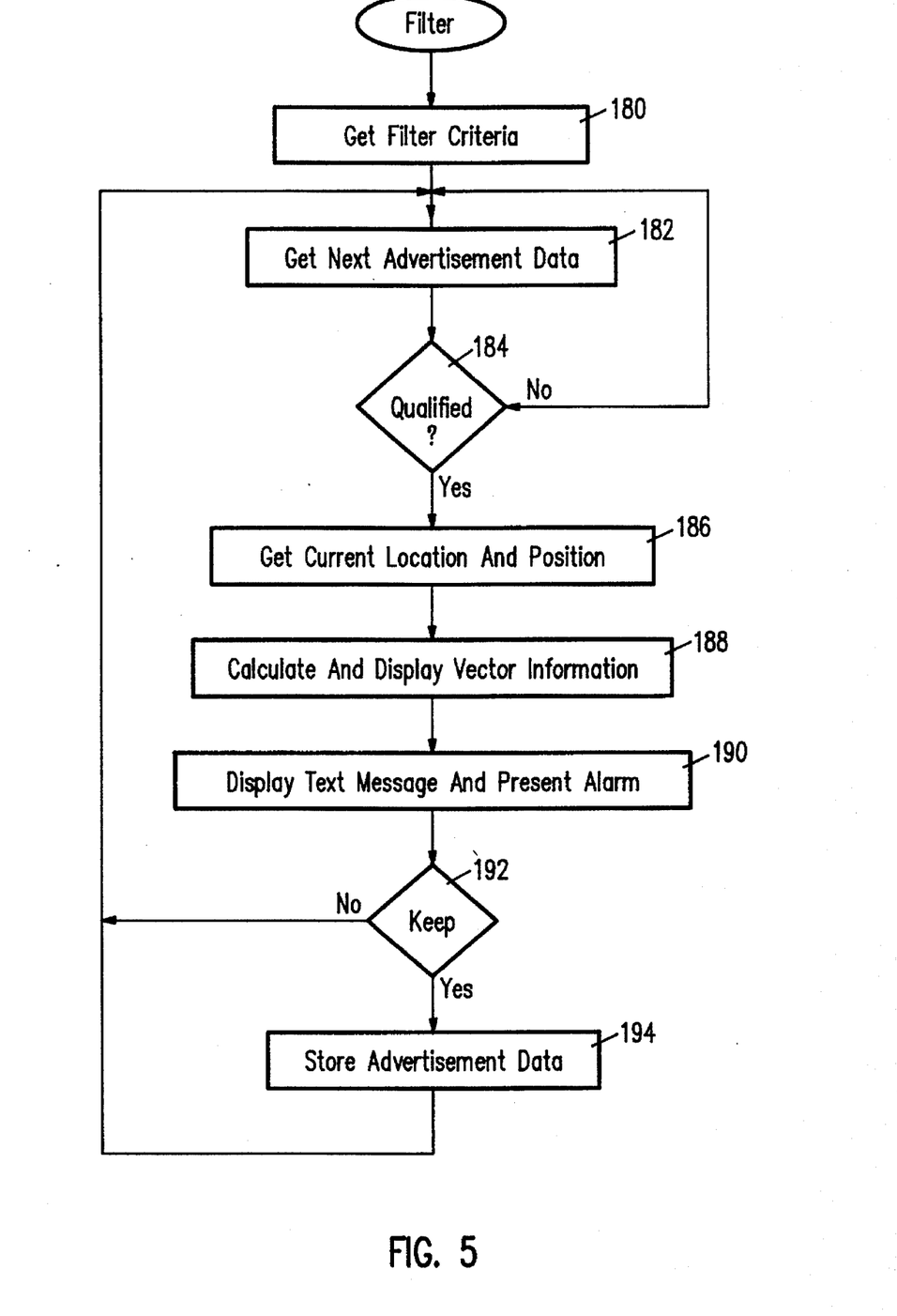
FIG. 5 illustrates by flow chart an alternative method for collecting information from the data broadcast whereby the operator designates collection criteria and the travel information device automatically collects qualifying data broadcast information.

FIG. 5 illustrates by flow chart an alternative method for gathering information from the data broadcast 22, i.e., gathering information automatically according to user-designated criteria in response to filter button 102h. In this manner, the operator need not monitor voice broadcast 22 to collect information of potential interest by way of data broadcast 26.

In FIG. 5, processing begins in block 180 where microprocessor 60 obtains, from the user, appropriate filtering criteria. For example, user interaction is conducted by way of display 100 and alternate functions defined for control inputs 102 to collect from the user a designation of filter criteria. For example, the user may be interested in all data records broadcast and being associated with a location within a given distance of current vehicle location. In this manner, the user collects advertising information for vendors in close and convenient proximity to current vehicle location. Also, data records are classified according to category, and the user designates as qualifying under user criteria certain categories of information. For example, the user may be interested in certain types of products or services advertised and having associated data records in data broadcast 22. In any event, block 180 represents user designation of criteria applied to data records appearing in data broadcast 22, i.e., which of those data records will be accepted and stored by device 40 for later reference by operation of the stored information button 102g.

Continuing to block 182, microprocessor 60 gets the next data record provided in data broadcast 22 and, in decision block 184, applies the user-designated criteria. If the data record collected in block 182 meets the user-designated criteria provided in block 180, then processing advances to block 186. Otherwise, processing returns to block 182 from decision block 184 to collect the next data record appearing in data broadcast 26. In block 186, microprocessor 60 obtains the current vehicle position and orientation. Continuing to block 188, microprocessor 60 calculates and displays the arrow icon at appropriate angle of orientation and the distance-to-travel value in display portions 100b and 100c, respectively.

Then, in block 190, microprocessor 60 displays the text message data available in the collected data record. An alarm presented in block 190 indicates to the user collection of a data record potentially of interest, i.e., satisfying the user-designated criteria provided in block 180. Decision block 192 allows the user opportunity to discard or keep for permanent storage the data record just collected. Accordingly, if the user declines storage of the just-collected data record then processing returns immediately to block 182. Otherwise, processing advances through block 194 where the just-collected data record is stored for later reference by operation of the stored information button 102g. Processing then returns from block 194 to block 182 for collection of a next data record.

As may be appreciated, an exit procedure (not shown) interrupts the data record collection loop represented by flow chart in FIG. 5. For example, the user may wish to terminate collection or may wish to modify the designation of data record collection criteria in block 180. Furthermore, processing at decision block 192 need not forego collection of additional data records in data broadcast 26. In other words, additional records may be queued for review by the operator even though microprocessor 60 is awaiting input at decision block 192. Also, should the operator not respond immediately at decision block 192, a time-out feature allows processing to advance without requiring user input, e.g., accepts for storage the data record qualifying under the user designated criteria and allows the user to later delete the record from device 40.

Figure 6:
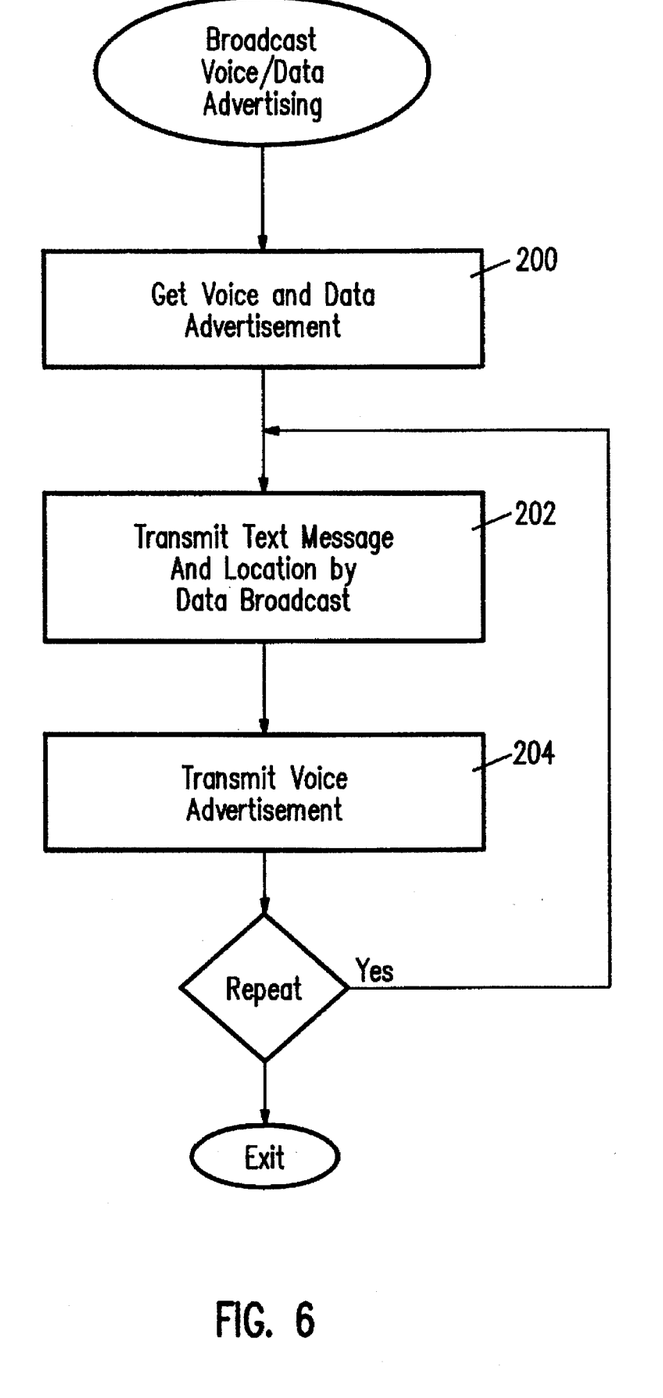
FIG. 6 illustrates by flow chart programming for a radio broadcast system coordinating or associating voice radio broadcast with data radio broadcast.

FIG. 6 illustrates by flow chart processing conducted by the radio broadcast system 20 in providing associated voice broadcast 22 and data broadcast 26. In FIG. 6, processing begins in block 200 where radio broadcast system 20 receives an advertising subscription including both voice advertising for presentation in the voice broadcast 22 and message information for presentation in the data broadcast 26. As noted herein above, association between the voice advertisement and message data is by simultaneous broadcast. Thus, system 20 transmits in block 202 the text message information and location information in data broadcast 26 followed by transmission of the voice presentation in voice broadcast 22. As may be appreciated, processing in blocks 202 and 204 repeats intermittently, i.e., according to how often and when the dual channel advertisement is to be broadcast.

Figure 7:
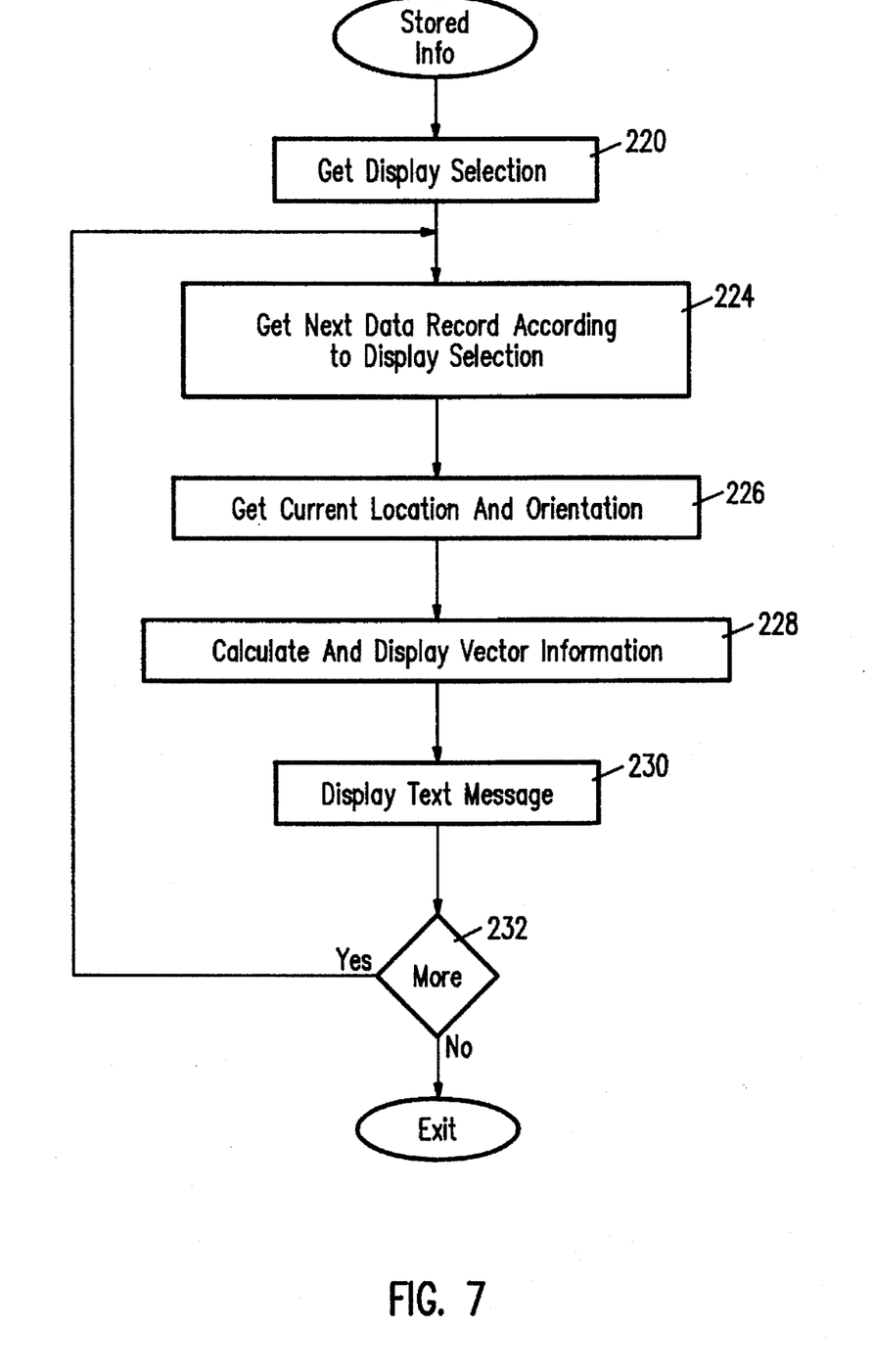
FIG. 7 illustrates by flow chart programming of the travel information device of FIG. 1 for scanning or reviewing of information stored therein.

FIG. 7 illustrates programming for microprocessor 60 in response to activation of the stored information button 102g. In FIG. 7, processing begins in block 220 where microprocessor 60 presents opportunity for the user to scan stored data records according to a given criteria, i.e., get a display selection from the user of device 40. For example, the user wishes to display data records according to a certain sequence or to display only records meeting a certain criteria, e.g., restaurant advertisements. Having obtained a display selection from the user, processing advances to block 224 where microprocessor 60 gets a next data record according to the user-designated display selection. Continuing to block 226, microprocessor 60 obtains the current vehicle position and orientation. Then, in block 228, microprocessor 60 calculates and presents display portions 100b and 100c, i.e., displays vector information indicating the distance and relative orientation to a geographic point of interest 14 corresponding to the data record currently presented. Continuing to block 230, microprocessor 60 displays at display portion 100a the text portion of the data record for review by the user. Decision block 232 provides the user opportunity to terminate scanning of stored information in which case processing exits from decision block 232. If the user continues scanning through the scored data records according to the designated display selection, then processing returns from decision block 232 to block 224 where a next data record in the sequence is selected for review by the user.

Important to note, as the user scans through stored data records and obtains a presentation on display 100, the then-current vehicle orientation and location are referenced to present a then-current relative position in display portions 100b and 100c, i.e., the current relative direction of travel and distance to the geographic point of interest 14 associated with the data record currently displayed by device 40. Also, processing illustrated in FIG. 7 initiates a timer interrupt procedure updating display portions 100b and 100c as the vehicle orientation and location relative to the currently displayed geographic point of interest 14 changes.

The scanning procedure illustrated in FIG. 7 may, as will be appreciated, be augmented to include additional features such as deleting data records, sorting on various fields of the text message portion, and applying additional category values whereby the user may better manage a collection of information maintained in device 40 and relevant to travel of vehicle 10 to and from geographic points of interest 14.

Thus, an improved vehicle information device and method of operation have been shown and described. Under the present invention, a user builds a customized database containing geographic points of interest, including precise longitude and latitude information and ability to provide distance and orientation of travel toward the geographic point of interest and in relation to the current vehicle location. In this manner, the user obtains useful information by way of radio signal without requiring reference to a massive digital database of the surrounding geographic area. Information obtained by radio signal is always current, i.e., replaced by subsequent broadcast. In this manner, the operator maintains a dynamic and up-to-date database of specific geographic points of interest.

It will be appreciated, that the present invention is not restricted to the particular embodiment or embodiments that have been described and illustrated herein, and that variations may be made therein without departing from the scope of the invention as found in the appended claims and equivalents thereof.

What is claimed is:

1. A method for providing specific time and location sensitive advertising information to a moving vehicle, said specific time and location sensitive advertising information being selected from a large body of advertising information including a large number of records, each record including a specific time and location sensitive advertising information, the method comprising the steps:

transmitting to said vehicle by radio time said large body of advertising information,     receiving at said vehicle said large body of advertising information;

at a specific time, determining the location of said vehicle; and     selecting for display at said vehicle one of said records for display, said selection being at least in part based on the time of day and upon the location of said vehicle.

2. A method of providing time and location sensitive advertising information to the operator of a moving vehicle, the method comprising the steps:

receiving multiple data records by radio signal, each data record containing time of day information and location sensitive advertising information;

storing said data records;

calculating current location for said vehicle; and selecting for display one of said records containing time of day information and location specific advertising information depending upon the time of day information and the location of said vehicle;

displaying said selected record containing time of day information and location specific advertising information.

* * * * *